United States Patent

[11] 3,591,849

| | | |
|---|---|---|
| [72] | Inventor | David T. Cavil<br>Menomonee Falls, Wis. |
| [21] | Appl. No. | 835,070 |
| [22] | Filed | June 20, 1969 |
| [45] | Patented | July 6, 1971 |
| [73] | Assignee | Outboard Marine Corporation<br>Waukegan, Ill. |

[54] VARIABLE TIMING MEANS FOR CAPACITIVE DISCHARGE IGNITION SYSTEM
15 Claims, 12 Drawing Figs.

[52] U.S. Cl. .................................................. 307/106, 315/218
[51] Int. Cl. .................................................. H03k 3/64
[50] Field of Search .......................................... 315/209, 218, 219; 307/106, 108

[56] References Cited
UNITED STATES PATENTS

| 3,048,704 | 8/1962 | Estes | 307/91 X |
| 3,219,877 | 11/1965 | Konopa | 315/218 X |
| 3,447,521 | 6/1969 | Piteo | 315/209 X |
| 3,478,249 | 11/1969 | Jukes | 315/218 X |

Primary Examiner—Robert K. Schaefer
Assistant Examiner—H. J. Hohauser
Attorneys—Robert K. Gerling, Robert E. Clemency, John W. Michael, Gerret D. Foster, Bayard H. Michael, Paul R. Puerner, Joseph A. Gemignami, Andrew O. Riteris and Spencer B. Michael ABSTRACT: Disclosed herein is a pulse generator for triggering a capacitor discharge ignition system. The pulse generator includes a rotor having a hub and a spaced concentric outer ring with magnets located in the space between the hub and the outer ring. The outer ring is provided with a variable reluctance zone located between the magnets. In some embodiments, the rotor induces two voltage pulses of different magnitudes in an adjacently located pickup coil during one revolution. The second voltage pulse triggers the ignition circuit within a low engine speed range and the first voltage pulse triggers the ignition circuit at speeds above the low speed range. The desired time lag between the voltage pulses and thus the desired timing advance is obtained by selection of the appropriate angular spacing between the magnets, and by selection of the location of the variable reluctance zones.

PATENTED JUL 6 1971

INVENTOR
DAVID T. CAVIL

BY Wheeler, Wheeler, House & Clemency
ATTORNEYS

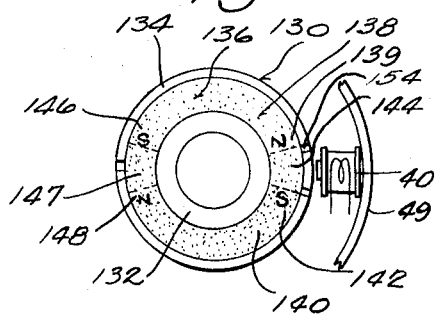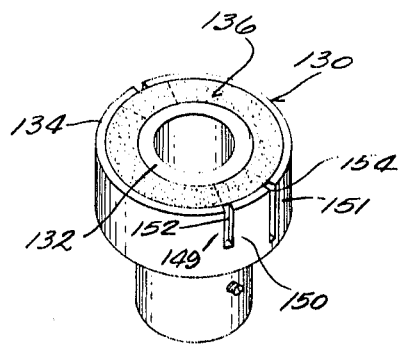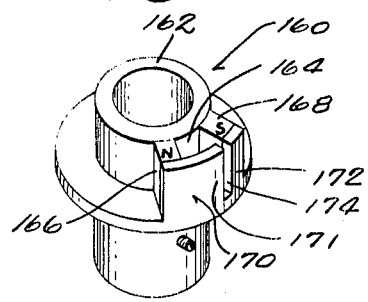

VARIABLE TIMING MEANS FOR CAPACITIVE DISCHARGE IGNITION SYSTEM

BACKGROUND OF THE INVENTION

The invention relates to capacitor discharge ignition systems and more particularly to a pulse generator for triggering a semiconductor switch which controls the discharge of a storage capacitor.

SUMMARY OF INVENTION

The invention provides a pulse generator which produces voltage pulses for triggering the discharge of the storage capacitor in a capacitor discharge ignition system and for providing an automatic timing advance with increase in engine speed.

In some embodiments, the pulse generator includes a rotor having a pair of spaced magnets. In other embodiments the magnets are formed by magnetized zones in a ferrite ring. The inner ends of the magnets are connected to a ferromagnetic hub which provides a magnetically soft link and a flux path between the magnets. The outer ends of the magnets are connected by a variable reluctance link. In some embodiments the variable reluctance link comprises a ring sector between the outer ends of the magnets with the ring sector provided with one or more slots. In other embodiments the high reluctance zone comprises a triangular notch or a tapered portion in a ring sector connecting the outer ends of the magnets.

In some embodiments of the invention, one revolution of the rotor induces first and second voltage pulses in an adjacently located stationary pickup or trigger coil as the variable reluctance zone of the rotor moves past the trigger coil. The first pulse is lower in magnitude than the second pulse and leads the second pulse in time by the desired timing advance.

The trigger coil is connected to a thyristor which is included in the ignition circuit and which controls the discharge of the storage capacitor. The magnitude of the voltage pulse required to make the thyristor conducting to discharge the capacitor remains constant. At engine speeds within a predetermined low speed range, the first voltage pulse has an insufficient magnitude to make the thyristor conducting. The second pulse has a sufficient magnitude to make the thyristor conducting at all engine speeds and thus makes the thyristor conducting at speeds within the predetermined low speed range to cause discharge of the capacitor and ignition voltage in the spark plug. With an increase in speed beyond the predetermined low speed range the first pulse attains a sufficient magnitude to make the thyristor conducting and thus causes an advance in ignition firing. By selecting the appropriate angular spacing of the magnets and the location and the configuration of the variable reluctance zone, the desired timing change can be obtained.

The invention also provides a shield which encloses the rotor and trigger coil and also supports the trigger coil. The shield minimizes the effects of extraneous signals on the trigger coil.

It is an object of the invention to provide a pulse generator which induces one or more voltage pulses in a trigger coil during one revolution of a pulse generator rotor to control the firing time of a capacitor discharge ignition system and provide an automatic timing advance with increase in engine speed.

It is a further object of the invention to provide a pulse generator with a rotor which includes a variable reluctance link interconnecting the ends of magnets and in which the magnets and variable reluctance link induce one or more voltage pulses in a trigger coil to control the firing time of an ignition system.

Further objects and advantages of the present invention will become apparent from the following disclosure.

DESCRIPTION OF THE DRAWINGS

FIG. 10 is a sectional view of a further embodiment of the pulse generator of the invention.

FIG. 11 is a perspective view of the rotor shown in FIG. 10.

FIG. 12 is a perspective view of the rotor of an additional embodiment of the invention.

DETAILED DESCRIPTION

Figure 1:
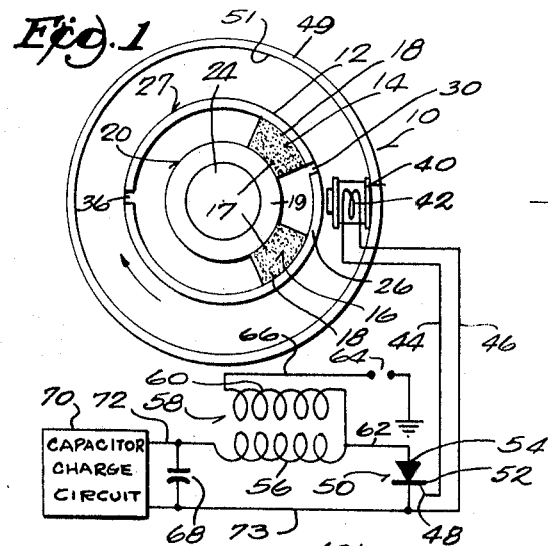
FIG. 1 is a sectional view of a pulse generator in accordance with the invention together with a schematic view of an associated ignition circuit.
Figure 2:
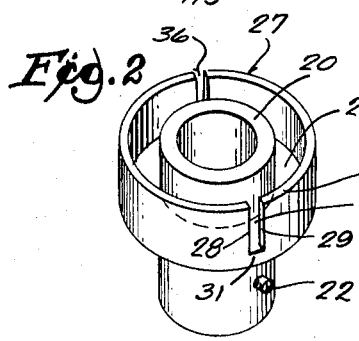
FIG. 2 is a perspective view of a portion of the rotor of the pulse generator shown in FIG. 1.

In the drawings, FIG. 1 discloses a pulse generator in accordance with the invention which is generally designated 10 and which includes a rotor 12. The rotor includes a pair of magnets 14 and 16, with each magnet having an inner end or pole 17 and an outer end or pole 18. Means defining a magnetically soft link are provided for connecting the inner poles or ends 17 of the magnets 14 and 16. As used herein, the term "magnetically soft" means a material having a relative magnetic permeability substantially greater than 1 and comparable to the permeability of ferromagnetic materials, i.e., and having a coercive force allowing ease of magnetization and demagnetization. As disclosed, the magnetically soft link comprises a portion 19 of a hub 20 with the ends 17 engaging the portion 19. The portion 19 provides a flux path between the magnets 14 and 16. The hub can also be provided with a set screw 22 (FIG. 2) for securing the hub 20 to an engine output shaft 24.

In accordance with the invention, means are provided defining a variable reluctance link connecting the outer ends 18 of the magnets 14 and 16. In the embodiment disclosed in FIGS. 1 and 2, the variable reluctance link comprises an outer member or a ring sector 26 of a concentric ring 27 which extends axially from an annular flange 27A on the hub 20. The outer member or ring sector 26 connects the outer ends 18 of the magnet and is provided with wall portions 28 and 29 which define a slot 30 which extends completely through the ring sector 26 in the radial direction and partially through the ring in the axial direction, leaving a web 31 which maintains the desired width of the slot 30 and affords a rigidity to the ring sector 26.

To facilitate magnetization of the magnet assembly 20, after the rotor 12 is assembled, the ring can be provided with a gap or slot 36.

The pulse generator also includes a trigger coil or pickup coil 40 having a winding 42 with two leads 44 and 46 which are connectable to a conventional ignition trigger circuit. In accordance with the invention, a shield 49 is provided for minimizing the effect of extraneous signals on the trigger coil 40 and for supporting the trigger coil 40. The shield 49 can be in the form of a sleeve or cylinder of flux conducting material such as a ferromagnetic material, with the coil 40 mounted on the interior wall 51 of the sleeve or cylinder.

As shown in FIG. 1, the trigger coil is connected to a thyristor 50 by leads 44 and 46. The lead 44 is connected to the gate 48 of the thyristor 50 and the lead 46 is connected to the cathode 52 of the thyristor 50. The anode 54 of the thyristor 50 is connected to the primary 56 of an ignition coil 58 and to the secondary 60 of ignition coil 58 by a lead 62. The secondary 60 is also connected to a spark plug 64 by a lead 66. The ignition circuit also includes a storage capacitor 68 which is connected by a lead 72 to one terminal of primary 58 and to one terminal of the capacitor charge circuit 70. The other terminal capacitor 68 is connected by a lead 73 to the other side of the charge circuit 70 and to the cathode 52 of the thyristor 50.

Figure 4:
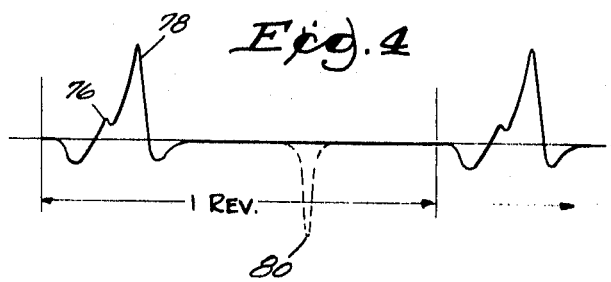
FIG. 4 is a diagram of the pulse waveform produced by the pulse generator shown in FIGS. 1 and 3.

In operation of the pulse generator shown in FIG. 1, one revolution of the rotor will induce in the trigger coil 40 two positive pulses 76 and 78 as shown in FIG. 4. The pulse 76 is less in magnitude than pulse 78 and is produced when the trailing edge of magnet 16 passes the trigger coil 40 when the rotor 12 is rotating in a clockwise direction. The pulse 78 is produced as the gap 30 passes the trigger coil. The optional gap 36 will produce a negative pulse 80 which is not utilized. Since the magnitudes of the pulses 76 and 78 are proportional to engine speed and also to the rate of rotation of the rotor, an automatic advance in ignition timing can be provided with an increase in engine speed in the associated ignition circuit by selecting the appropriate angular spacing of the magnets 14 and 16 to provide the desired time lag between the pulses 76 and 78. Within a predetermined low engine speed range or rate of rotation, the pulse 76 does not have a sufficient magnitude to make the thyristor conducting, but the magnitude of pulse 78 is adequate to make the thyristor conducting. At engine speeds above the predetermined low engine speed range, the pulse 76 has a sufficient magnitude to make the thyristor conducting and to discharge the capacitor 68 in advance of the firing time afforded by the pulse 78.

Figure 3:
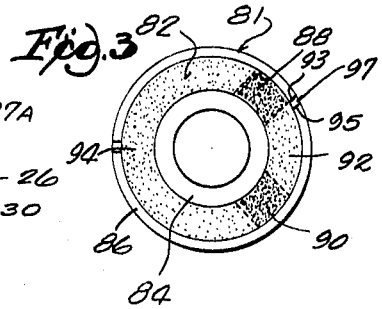
FIG. 3 is a modified embodiment of the pulse generator shown in FIG. 1.

In the embodiment of the pulse generator shown in FIG. 3, there is included a magnet assembly 81 with a complete ferrite ring 82 concentric with a hub 84 and located between the hub 84 and an outer ring 86.

The ferrite ring 82 can be magnetized to provide two magnetized or polarized zones 88 and 90 separated by saturated or nonmagnetic zones 92 and 94. In the FIG. 3 embodiment the means defining a variable reluctance link connecting the outer ends of the magnetized zones 88 and 90 comprises a gap 97 defined by wall portions 93 and 95, which gap extends completely through the ring 86 in a radial direction, but only partially through the ring in an axial direction. The pulse generator shown in FIG. 3 will produce a pulse as shown in FIG. 4.

In the FIG. 3 embodiment, the required timing advance can be obtained by selection of the location of the gap 97 and by selection of the angle between the magnetized zones 88 and 90.

Figure 5:
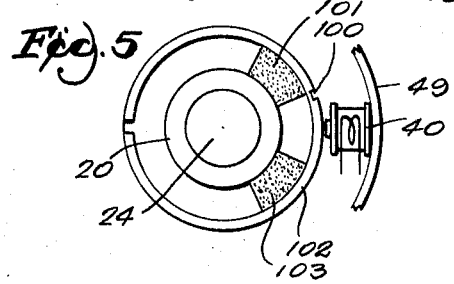
FIG. 5 is a sectional view of a further embodiment of the pulse generator of the invention.
Figure 6:
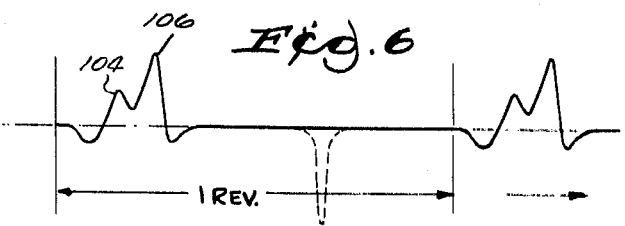
FIG. 6 is a diagram of the pulse waveform produced by the pulse generator shown in FIG. 5.

In the embodiment shown in FIG. 5, the means defining a variable link for connecting the outer ends of the magnets includes a slot 100 in a ring 102. The slot is located between the magnets 101 and 103 and the slot extends completely through the ring in the axial direction and only partially through the ring in the radial direction. FIG. 6 shows the wave pulses 104 and 106 which are produced by the FIG. 5 embodiment. The difference in magnitude of the pulses is less than the pulses shown in FIG. 4 for the FIG. 1 and 3 embodiments.

Figure 7:
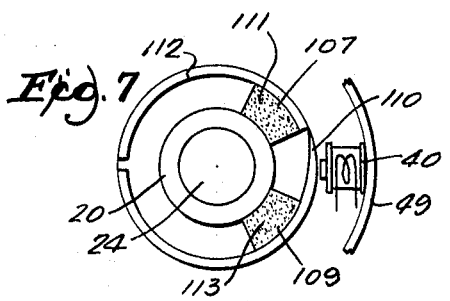
FIG. 7 is a sectional view of an additional embodiment of the pulse generator of the invention.

FIG. 7 shows a further embodiment of the invention in which the means defining a variable reluctance link for connecting the outer ends 107 and 109 of the magnets 111 and 113 is provided by a tapered wall portion 110 located in ring 112 between magnets 111 and 113.

Figure 9:
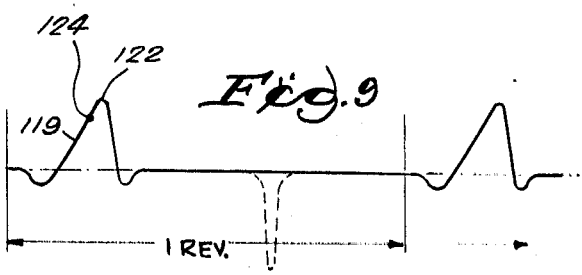
Fig. 9 is a diagram of the pulse waveform produced by the pulse generators shown in FIGS. 7 and 8.
Figure 8:
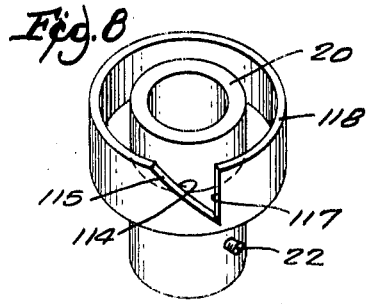
FIG. 8 is a perspective view of a portion of a further embodiment of the invention.

FIG. 8 shows an additional embodiment of the invention in which the means defining a variable reluctance link is formed by a triangular notch 114 defined by wall portions 115 and 117 in the outer ring 118. The variable reluctance links in FIGS. 7 and 8 produce a ramp type pulse 119 (FIG. 9).

In operation of the pulse generators shown in FIGS. 7 and 8, the thyristor 50 will be triggered in the low speed range by the peak 122 of pulse 119. As the engine speed increases beyond the low speed range, the thyristor will be triggered or made conducting when a point 124 on the slope attains the required voltage magnitude to fire the ignition system in advance of the peak 122.

FIGS. 10 and 11 show a further embodiment of the invention in which the rotor 130 includes a hub 132, an outer ring 134 and a ring of ferrite 136 located between the hub 132 and the outer ring 134. When the rotor is assembled the ferrite ring is magnetized to provide a polarized portion 138 with a north pole 139, and a south pole 146 and a polarized portion 140 with a south pole 142 and a north pole 148. The north and south poles 139 and 142 are separated by a saturated zone 144. The north and south poles 148 and 146 are separated by a saturated zone or dead zone 147.

In the embodiment disclosed in FIGS. 10 and 11, the means defining a magnetically soft link for connecting the inner ends of the magnets comprises the ferromagnetic hub 132. The means defining a variable reluctance link connecting the outer ends of the magnets comprises wall portions 149, 150 and 151 which define first and second zones or slots 152 and 154. The slots 152 and 154 extend completely through the ring in the radial direction and partially through the ring in the axial direction. The second slot 154 has a greater axial length than the first slot or zone 152, and the second slot 154 has a higher reluctance than the first slot 152.

In operation of the pulse generator shown in FIGS. 10 and 11, the pulses produced are similar to those shown in FIG. 4 with two peaks, with the first peak being less in magnitude and leading the second peak. The slots 152 and 154 are spaced at a predetermined angle to obtain the desired timing increase.

FIG. 12 shows a further embodiment of the invention in which the rotor 160 includes a hub 162 with a hub portion 164 which forms the magnetically soft link interconnecting the inner ends or poles of magnets 166 and 168. The means defining a variable reluctance link connecting the outer ends of the magnets is in the form of a ring sector 170 with wall portions 171 and 172 which define a slot 174 which extends completely through the ring in the radial direction and partially through the ring in the axial direction.

Various of the features of the invention are set forth in the following claims.

What I claim is:

1. A pulse generator for an ignition system, said pulse generator comprising a trigger coil for actuating the ignition system, a rotor located in adjacent relation to said trigger coil, said rotor including a pair of spaced magnets having inner and outer ends, means defining a magnetically soft link for connecting said inner ends of said magnets, and means defining a variable reluctance link for connecting said outer ends of said magnets.

2. A pulse generator in accordance with claim 1, wherein said means defining a magnetically soft link for connecting said inner ends of said magnets comprises a ferromagnetic hub located interiorly of said magnets with portions of said hub engaging said inner ends of said magnets.

3. A pulse generator in accordance with claim 1, wherein said means defining a variable reluctance link for connecting said outer ends of said magnets comprises an outer member engaging said outer ends of said magnets, said outer member including wall portions located between said magnets, said wall portions defining a slot which extends completely through said outer member in the radial direction and partially through said outer member in an axial direction.

4. A pulse generator in accordance with claim 1, wherein said means defining a variable reluctance link for connecting said outer ends of said magnets comprises an outer member engaging said outer ends of said magnets, said outer member including wall portions located between said magnets, said wall portions defining a slot which extends completely through said outer member in the axial direction and partially through said outer member in a radial direction.

5. A pulse generator in accordance with claim 1, wherein said means defining a variable reluctance link for connecting said outer ends of said magnets comprises an outer member engaging said outer ends of said magnets, said outer member including a tapered wall portion between said magnets.

6. A pulse generator in accordance with claim 1, wherein said means defining a variable reluctance link for connecting said outer ends of said magnets comprises an outer member engaging said outer ends of said magnets, said outer member including wall portions located between said magnets, said wall portions defining a triangular notch.

7. A pulse generator in accordance with claim 1, wherein said magnets comprise magnetized zones in a ferrite ring carried by said rotor and said means defining a variable reluctance zone for connecting the outer ends of said magnets comprises a ring concentric with the axis of rotation of said rotor and located around and in engagement with the periphery of said ferrite ring, wall portions in said ring between said polarized zones, said wall portions defining first and second spaced slots, with said second slot having a greater axial length than said first slot.

8. A pulse generator in accordance with claim 7, wherein said magnetized zones are separated by nonmagnetized zones.

9. A pulse generator in accordance with claim 1, wherein said magnet comprise polarized zones in a ferrite ring carried by said rotor, said polarized zones being separated by nonpolarized zones.

10. A pulse generator for an ignition system, said pulse generator comprising a trigger coil for actuating the ignition system, a rotor located in adjacent relation to said trigger coil, said rotor including a hub, an annular outer ring concentric with said hub and spaced from said hub, a pair of spaced magnets located between said hub and said ring, said ring including wall portions defining a high reluctance zone located between said magnets, said rotor cooperating with said trigger coil to induce first and second voltage pulses in said trigger coil during one revolution of the rotor, said second voltage pulse having a sufficient magnitude to trigger the ignition system upon rotation of said rotor below a predetermined rate of rotation and said first pulse having a sufficient magnitude to trigger the ignition system upon rotation of said rotor above said predetermined rate of rotation.

11. A pulse generator in accordance with claim 10, in combination with an ignition system including a thyristor having an anode, a cathode and gate, an ignition coil having a primary and secondary, a capacitor, and means for electrically connecting said trigger coil to said gate and said cathode of said thyristor for connecting said anode to one side of said primary, for connecting one side of said capacitor to the other side of said primary, and for connecting the other side of said capacitor to said cathode of said thyristor.

12. A pulse generator for an ignition system, said pulse generator comprising a shield constructed of flux conducting material and having an interior wall, a rotor located within said shield, said rotor including a magnet assembly, and a trigger coil mounted on said interior wall of said shield in adjacent relation to said rotor and with the axis of said coil extending radially to the axis of said rotor.

13. A pulse generator for an ignition system, said pulse generator comprising a trigger coil for actuating said ignition system, a rotor located in adjacent relation to said trigger coil, said rotor including a hub, said hub being adapted to be connected to an engine output shaft, an annular flange connected to said hub, an annular ring concentric with the axis of rotation of said rotor and connected to and extending axially from said flange, a pair of angularly spaced magnets located between said ring and said hub and wall portions in said ring between said magnets, said wall portions defining a high reluctance zone.

14. A pulse generator for an ignition system, said pulse generator comprising a rotor including a pair of magnets which have inner and outer ends, said outer ends of said magnets being angularly spaced a predetermined distance, means defining a magnetically soft link for connecting said inner ends of said magnets, and means defining a variable reluctance link for connecting said outer ends, said variable reluctance link having wall portions defining a first zone and wall portions spaced from said first wall portions defining a second zone, said second zone having a higher reluctance than said first zone.

15. A pulse generator in accordance with claim 12 wherein said magnet assembly includes an inner hub and an annular ring connected to said hub and extending in concentrically spaced relation thereto, a pair of angularly spaced magnets located between said ring and said hub, and wall portions defining a high reluctance zone in said ring between said magnets.